(12) United States Patent
Olson et al.

(10) Patent No.: US 8,068,745 B2
(45) Date of Patent: Nov. 29, 2011

(54) RF SIGNAL POWER REGULATION IN OPTICAL TRANSMITTERS

(75) Inventors: Todd Edward Olson, San Marino, CA (US); Nghia Kha, Diamond Bar, CA (US); Hy Thai, San Gabriel, CA (US); Todd Kellison, Pearisburg, VA (US); Frank Berardi, Arcadia, CA (US)

(73) Assignee: Emcore Corporation, Albuquerque, NM (US)

( * ) Notice: Subject to any disclaimer, the term of this patent is extended or adjusted under 35 U.S.C. 154(b) by 677 days.

(21) Appl. No.: 12/180,966

(22) Filed: Jul. 28, 2008

(65) Prior Publication Data

US 2010/0021183 A1 Jan. 28, 2010

(51) Int. Cl.
*H04B 10/04* (2006.01)

(52) U.S. Cl. ........ 398/193; 398/194; 398/195; 398/196; 398/197; 398/135; 398/136; 398/137; 398/38; 372/32; 372/34; 372/36; 372/38.02

(58) Field of Classification Search ............... 398/182, 398/183, 186, 187, 188, 192, 193, 194, 195, 398/196, 197, 198, 135, 136, 137, 138, 139, 398/164, 33, 38, 25, 26, 27, 22, 23, 24, 128, 398/130; 372/32, 34, 36, 38.02
See application file for complete search history.

(56) References Cited

U.S. PATENT DOCUMENTS

| 7,826,739 B2* | 11/2010 | Nelson et al. ........... 398/22 |
| 2004/0136421 A1* | 7/2004 | Robinson et al. ........ 372/38.02 |

* cited by examiner

*Primary Examiner* — Hanh Phan

(57) ABSTRACT

A circuit controlling the gain of an amplifier in an optical transmitter used for optical communication, including a detection circuit for measuring the power of the RF input to a laser; a gain controller or controlling a gain of an amplifier, and a switch connected to the gain controller, wherein the gain controller is adapted, in response to an activation of a switch, to: (i) automatically vary gain of the amplifier, and (ii) set the gain of the amplifier at a level corresponding to a reduction in the noise and/or distortion associated with the transmitter.

22 Claims, 2 Drawing Sheets

Noise Power Ratio (NPR)
Typical_135 Link, 10dB optical loss

RF SIGNAL POWER REGULATION IN OPTICAL TRANSMITTERS

BACKGROUND OF THE INVENTION

The invention relates to the measurement and adjustment of the power of an RF signal input into a laser used for optical communication, typically over a fiber optic link.

It is important to regulate the RF power of a signal input into a laser transmitter: if the power is too high, distortion results; on the other hand, if the power is too low, noise results. Both distortion and noise lead to degradation of the signal transmitted over the optical communications link (such as a fiber optic cable) and it is therefore desirable to reduce both noise and distortion in the signal.

The reduction of noise and distortion may involve first determining the amount of noise and distortion in a signal, and then reducing these unwanted features. There are a number of ways in which the distortion and noise of a signal may be measured. For example, Third Order Intercept, Carrier to Intermodulation, Spur Free Dynamic Range, Noise Figure and Carrier to Noise Ratio are all methods which may be employed to measure noise and distortion. Noise Power Ratio (NPR) is particularly useful as this is a single measurement combining the effects of both distortion and noise.

A number of methods of regulating the power of a RF signal input to a laser are known. A first known method of regulating the power of the input RF signal to a laser (herein referred to as "$S_L$") is by using a fixed gain amplifier. However, such a fixed gain amplifier produces a gain for the RF input signal to the laser which may, as the characteristics of the RF input signal vary, result in degraded performance. An amplifier with a fixed gain setting is unable to adapt to changes in the power of the RF input signal. A fixed gain setting which may be optimal initially may therefore result in noise and distortion as time progresses. Furthermore, where the RF input signal for the laser includes more than one data channel multiplexed over a single optical fiber link, with each of the channels corresponding to a different data source, an optimal setting for one of the channels will not necessarily be optimal for any of the other channels, resulting in further potential degradation of the quality of the communication. For these reasons, such fixed gain amplifiers often result in degraded performance.

A second known method of controlling the power of a signal input to a laser involves the use of a manual gain control. Manual gain control suffers from the disadvantage that it requires a degree of skill and expertise on the part of the user to be implemented effectively. Furthermore, if the power of the RF input signal varies significantly over time, further user intervention is required to optimize the gain of the amplifier. Similar to fixed gain control, manual gain control suffers from the disadvantage mentioned above: where the RF input signal to the laser represents multiple data channels multiplexed over a single optical fiber link, the user is unable to easily determine the optimum gain setting to avoid noise and distortion in the RF input signal.

A further known method of optimizing gain control is automatic gain control which suffers from the disadvantage that where multiple channels are transmitted across a single fiber optic communication link, a change in gain in a particular channel may degrade the performance of another channel.

It is also known to combine automatic gain control with fixed gain control by switching between these two modes so that the gain setting for fixed gain control is automatically determined during an initialization step using automatic gain control. However, this requires a certain degree of expertise on the part of the user and can result in errors if not implemented correctly.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for designing other methods and systems for carrying out the several purposes of the present invention. It is important therefore that the claims be regarded as including equivalent constructions insofar as they do not depart from the scope of the present invention.

SUMMARY OF THE INVENTION

It is advantageous to provide a gain control of a RF signal input to a light source used in fiber optic communication which addresses the aforementioned problems.

Embodiments of the invention relate to an optical transmitter or communications module for communicating information, said optical communications module comprising an amplifier to amplify a modulated signal which forms an RF input to a laser, an output of said laser varying in accordance with said modulated signal, said module further comprising:
  (a) a detection circuit for measuring the power of an RF input to said laser;
  (b) a gain controller for controlling a gain of said amplifier, said gain controller being connected to said detection circuit; and
  (c) a switch connected to said gain controller,
wherein said gain controller is adapted, in response to an activation of said switch, to:
  (i) automatically vary said gain of said amplifier, and
  (ii) set said gain of said amplifier at a level corresponding to a reduction in said noise and/or said distortion.

A user is able to automatically optimize the gain of the amplifier by activating the switch. This is a simpler and more easily operable manner of automatically setting the gain than those previously known.

Further embodiments of the invention relate to an optical communications module for communicating information, said optical communications module comprising an amplifier to amplify a modulated signal which forms an RF input to a laser, an output of said laser varying in accordance with said modulated signal, said module further comprising:
  (a) a power detection circuit for measuring a power of said RF input to said laser; and
  (b) a gain controller for controlling a gain of said amplifier, said gain controller being connected to said power detection circuit, wherein
  said gain controller is adapted to vary said gain of said amplifier in response to the power detection circuit determining that said power of said RF input falls outside of a predetermined range.

By allowing the gain to fluctuate within a predetermined range, embodiments of the invention remove the need for continuous gain adjustment. Furthermore, when the RF input includes a plurality of channels, embodiments of the invention ensure that a change in the power of one of the channels does not unnecessarily lead to a change in the overall gain. Furthermore, these arrangements take advantage of the noise requirements of certain transmission channels such as satellite transmission to avoid unnecessary gain adjustments.

Further embodiments of the invention relate to a method of controlling gain of an amplifier in an optical communications module, said module comprising an amplifier to amplify a modulated signal which forms an RF input to a laser, an output of said laser varying in accordance with said modulated signal, said method comprising the steps of:

(a) measuring the power of said RF input to said laser;
(b) receiving an activation signal, and in response to said activation signal:
(c) automatically varying said gain of said amplifier, and
(d) when the RF power is optimized, setting said gain of said amplifier at a constant level.

Further embodiments of the invention relate to a method of controlling gain of an amplifier in an optical communications module, said module comprising an amplifier to amplify a modulated signal which forms an RF input to a laser, an output of said laser varying in accordance with said modulated signal, said method comprising the steps of:

(a) measuring a power of said RF input to said laser; and
(b) varying said gain of said amplifier in response to determining that said power of said RF input falls outside of a predetermined range.

DETAILED DESCRIPTION OF PREFERRED EMBODIMENTS

Figure 1:
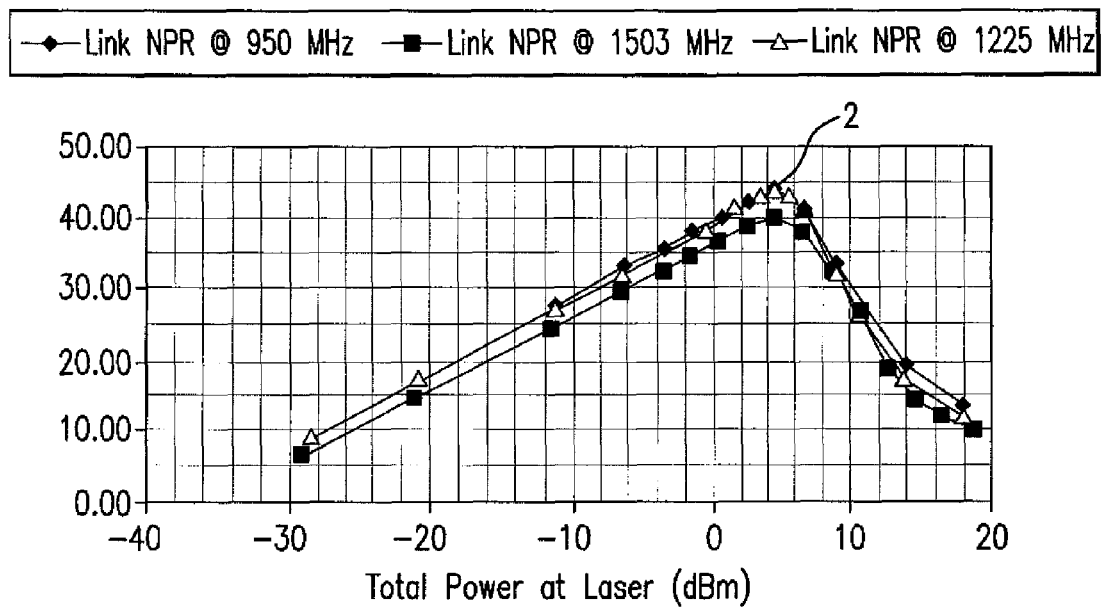
FIG. 1 is a graph of Noise Power Ratio as a function of total power input in a transmitter of a known optical transmission system.

FIG. 1 illustrates the Noise Power Ratio NPR as a function of the total power of an RF signal input to a laser in a typical fiber optic transmitter for three distinct frequencies. As illustrated in this Figure, the graph exhibits a clear peak 2 at around 5 dBm. This peak represents the optimal NPR for this particular configuration. It will be realized that the value of the power of the signal input into the laser, and therefore the optimal NPR, will vary depending on the particular configuration of the system.

Figure 2:
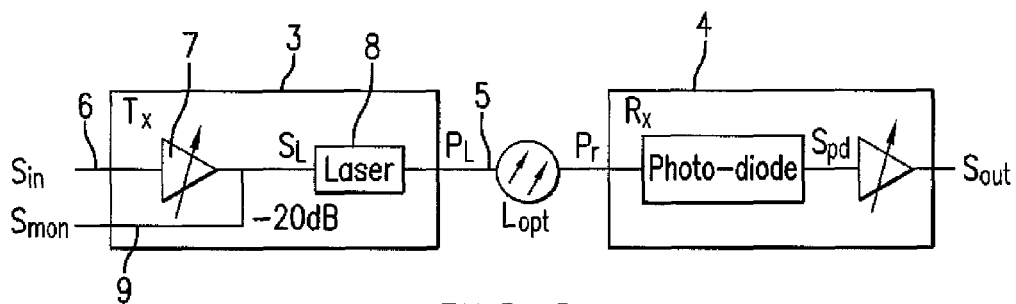
FIG. 2 is a schematic representation of a known fiber optic transmitter and fiber optic receiver connected by a fiber optic cable.

FIG. 2 is a schematic representation of a known fiber optic transmitter 3 and fiber optic receiver 4 joined by a fiber optic cable 5. The transmitter 3 includes an RF input 6 connected to an amplifier 7 which is in turn connected to laser 8. The laser 8 produces optical signals (such as amplitude modulated continuous wave signals) which are transmitted by fiber optic cable 5 to receiver 4. The transmitter 3 further includes a monitoring line 9 connected between the amplifier 7 and the laser 8. As designated in FIG. 2, the RF input signal on input 6 is $S_{IN}$, the signal emanating from the amplifier 7 and input to laser 8 is designated $S_L$, whereas the signal on the monitoring line 9 is designated $S_{MON}$.

A first known method of regulating the power of $S_L$ is by using a fixed gain amplifier. In this case the amplifier 7 depicted in FIG. 2 has a fixed gain setting which is chosen to provide an optimal power for $S_L$ for the most typical values of the power of the RF input signal $S_{IN}$. The chosen value of the gain of the amplifier in this case will depend on the nature of the signals transmitted.

A second known method of controlling the power of a signal input to a laser involves the use of a manual gain control. In this case, a user is able to vary the gain of amplifier 7 depicted in FIG. 2. Manual gain control requires some form of feedback so that a user is able to determine when the gain of the amplifier is optimal, or at the very least when a change in gain results in improved performance. Various forms of feedback are used such as: monitoring the monitor line 9 with a conventional power detector or with a power detector incorporated into transmitter 3, or measuring the quality of the signal produced at the receiver ($S_{OUT}$).

A further known method of optimizing gain control is automatic gain control. In this case, the transmitter 3 depicted in FIG. 2 is provided with a gain controller for controlling the gain of the amplifier 7 and an automatic monitor which monitors the RF signal input to the laser 8 (for example, by means of monitoring the monitoring line 9). The power of the RF signal input to the laser 8 is then automatically controlled to stay within a narrow range depending on the reading taken of the monitoring line 9.

Figure 3A:
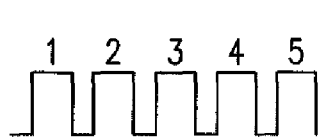
FIGS. 3A and 3B are illustrations of a variation in power in a channel of a multi-channel signal.
Figure 3B:
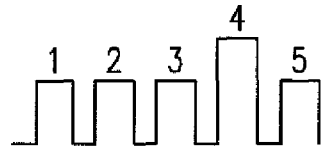

Automatic gain control to a narrow range suffers from the disadvantage that where multiple channels are transmitted across a single fiber optic communication link, an increase in gain in a particular channel may not be optimally compensated for. FIG. 3A illustrates the power level of individual channels, 1 through 5, communicated on a single fiber optic link. FIG. 3B illustrates the same five channels illustrated in FIG. 3A where there has been an increase in the power of one of these channels, channel 4. In automatic gain control, it is the total power that is measured. Therefore, an increase in the power of one of the channels, as illustrated in FIG. 3B, causes an increase in the total power. Automatic gain control will vary the gain of the RF input signal (which includes all channels) to the laser to compensate for the corresponding change to the total power of that RF input signal. As a result, for channels 1, 2, 3, and 5, the RF power levels input to the laser, and subsequently at the output of the complete link ($S_{out}$) will have changed, even though the original signals at the input to the transmitter ($S_{in}$) had not changed. Therefore, the resulting gain change may degrade the signals communicated over the unaffected channels 1, 2, 3 and 5. Furthermore, if the gain of one of the channels illustrated in FIGS. 3A and 3B varies over time whereas the remaining channels remain substantially constant, the performance of the non-varying channels will be significantly affected over time.

Figure 4:
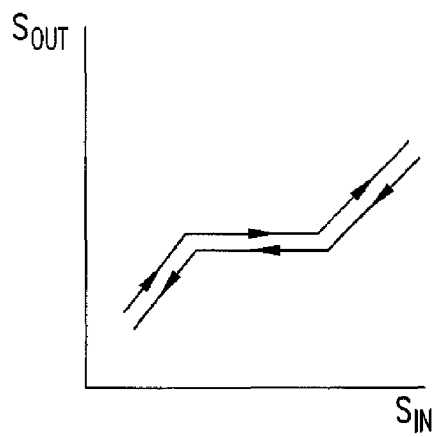
FIG. 4 is a diagram of power variation of an RF input and an output signal in the fiber optic transmitter and receiver illustrated in FIG. 2.

The gain control hereinbefore described results in a variation in the power of the RF input signal to the laser compared to that of the output signal at the receiver 4 ($S_{OUT}$—FIG. 2) as illustrated in FIG. 4. As the power of the RF input signal increases and then decreases, so does the power of the output signal.

Figure 5:
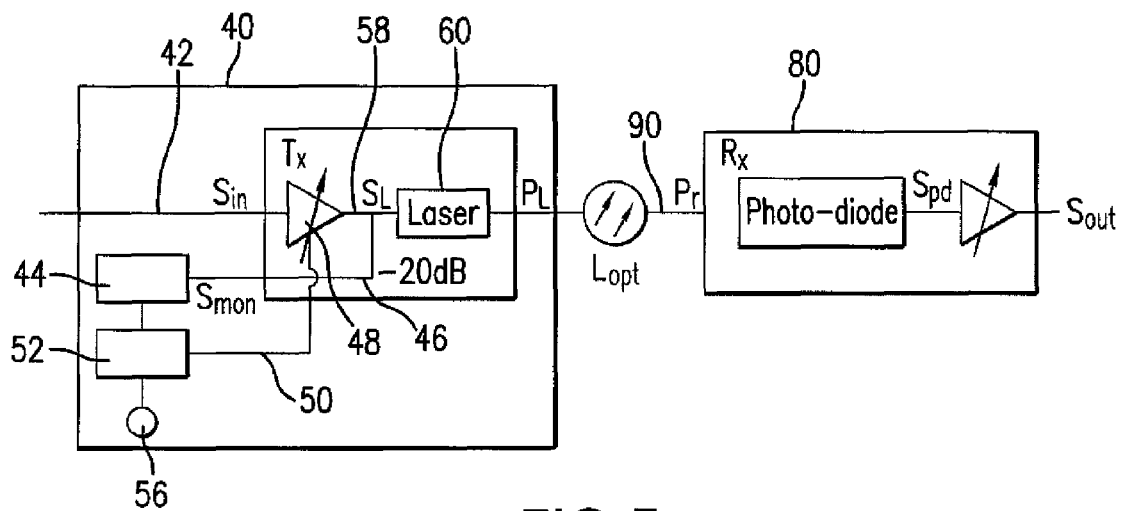
FIG. 5 depicts a schematic representation of a fiber optic transmitter and fiber optic receiver connected by a fiber optic cable according to a preferred embodiment of the invention.

FIG. 5 is a schematic representation of an optical communications module 40 (which in the embodiment illustrated is a transmitter) and fiber optic receiver 80 joined by a fiber optic cable 90. The transmitter 40 includes an RF input 42 (denoted $S_{IN}$) connected to an amplifier 48.

The amplifier 48 is a variable amplifier and a control line 50 connects the amplifier 48 to a gain control circuit 52. The gain control circuit 52 is connected to a switch 56. The gain control circuit 52 is further connected to an RF detection circuit 44. The RF detection circuit 44 detects the noise and distortion of the amplified RF input 58, but to do so an attenuation of −20 dB is included in the line 46 connecting this RF input to the RF detection circuit 44 ($S_{MON}$). Embodiments with attenuations different from −20 dB are also within the scope of the present invention. In the embodiment illustrated, it is the RF power of $S_{MON}$ which is measured by the RF detection circuit 44. In alternative embodiments, other characteristics of the RF input may be determined. The output 58 from the amplifier 48 forms an RF input to a laser 60.

During operation, a signal which has been modulated according to an information signal (not shown in the attached figures) forms the RF input signal $S_{IN}$ 42. As described, the amplified RF input signal $S_L$ is monitored by the RF detection circuit 44, through the monitoring line $S_{MON}$. The results of this monitoring are used by the gain control circuit 52 to control the gain of the amplifier 48 in a manner according to the invention as described in greater detail below. The laser power varies in accordance with the modulation of the input signal and these light variations are transmitted by the optical fiber 90 to the receiver 80 where the modulated light or optical signal is converted back into electromagnetic signals at this remote location in a known manner.

The activation of the switch 56 causes the RF detection circuit 44 to measure the RF power of the signal $S_L$ produced by the amplifier 48. At the same time, the activation of the switch 56 causes the gain control circuit 52 to vary the gain of the amplifier 48. The RF detection circuit 44 is able to determine the gain applied by the gain control circuit 52 and to correlate this with the optimum NPR via data typical to that shown in FIG. 1. Therefore, the RF detection circuit 44 is able to determine the power level which corresponds to an optimized NPR and, when the level of the gain is sufficiently increased and decreased, the RF detection circuit 44 is able to determine the gain setting corresponding to an optimum NPR. The RF detection circuit 44 then controls the gain controller 52 to set the gain of the amplifier 48 to the optimal level (i.e. the level corresponding to the optimum NPR setting).

It is to be realized that the optimal value of the gain for the amplifier 48 determined in this way is dependent on the input signal $S_{IN}$ received during the time that the measurements of the NPR are made prior to setting the gain. Therefore, the gain set as a result of this operation may not be optimal for further values of the input signal $S_{IN}$. To rectify this, a user reactivates the switch 56 which reinitiates the process described and which will then result in the optimal value of the gain of the amplifier 48 being found for the now changed value of $S_{IN}$.

The switch 56 is activated by a user. In a first embodiment, the switch 56 is activated manually. In further embodiments, the switch 56 is remotely activated by a signal generated by the user and received by a wire (not shown) connected to the transmitter 40. In a further embodiment, the switch 56 is activated by software. Importantly, the entire process is automatic once the switch 56 has been activated (or any other appropriate input, which can be achieved through a single user action, has been received). By automatically optimizing the gain, this process is significantly simplified over the processes currently known and is easier to operate.

In an alternative embodiment a process for controlling the gain of the amplifier 48 is initiated by activation of a switch that is similar to switch 56. Thereafter, the RF detection circuit 44 will continuously meter the power of the signal produced by the amplifier 48 and vary the gain of the amplifier 48 by sending an appropriate signal to the gain control circuit 52 when the power of the signal $S_L$ falls outside of a predetermined range. It will be realized that the predetermined range will depend on the application of the transmitter 40 and, in particular, to the manner in which information is transmitted by the transmitter 40. The inventors have found that predetermined ranges of the power of 1, 5, 10, and 15 dB all have advantages, depending on the use to which the transmitter 40 is being put. Other ranges have value for different applications so are covered by this patent as well.

If the power falls above the predetermined range, the gain is reduced; if it falls below this range, the gain is increased. This predetermined range, in addition to defining an amount by which the gain can vary, defines a minimum and maximum amount for the power of the signal. To determine the minimum and maximum, an initial setting for the gain is determined according to one of the aforementioned processes. The predetermined range is then set so that the initial gain setting corresponds to a midpoint of the predetermined RF power range.

By way of example, the gain range may be set so that the total power of $S_L$ lies in between the values of −10 dBm and 8 dBm. In this example, if the measured power falls between these values, the gain of the amplifier will be kept constant. However, if the power of $S_L$ lies outside of these values, the gain will be adjusted to bring the power value back within the acceptable range. If the total power drops to −12 dBm, then the RF detection circuit 44 will send a signal to the gain control circuit 52 to increase the gain by 2 dB which would result in a power value of −10 dBm. If, after this adjustment, the total power of the $S_{IN}$ signal increases another 3 dBm, such that $S_L$ is now −7 dBm, the gain would not be varied as the power is now within the acceptable values of the predefined range.

In this embodiment the RF detection circuit measures the power and this is used to determine the gain. It is to be realized that in this embodiment the RF detection circuit 44 may therefore be replaced by a circuit which only detects power.

In a further embodiment measurements relating to the noise and/or power of one of the signals is used. In one of these embodiments, the Noise Power Ratio (NPR) of the signal produced by the optical link is measured and used to determine whether the gain should be altered by defining an acceptable range within which the NPR could fall.

As previously described, in a preferred embodiment, the transmitter 40 transmits a signal which comprises more than one channel of data, such as the signals illustrated in FIGS. 3A and 3B. The channels may correspond to different data types and corresponding protocols. The aforementioned aspect of the invention of varying the gain only where the measured NPR falls outside of a predetermined range is particularly applicable to the transmission of data derived from satellite transmissions. Signals from satellite transmissions have lower quality requirements than can be achieved with optical transmissions. For example, for some satellite transmissions, the acceptable NPR is around 10 dB. For the optical transmission on the other hand, the achievable NPR may be 40 dB or more. Therefore, a certain degree of degradation in the signal is acceptable. In this case a variation in a particular carrier will very rarely affect the gain settings of all of the channels.

It is to be realized that in the method of varying the gain of the amplifier 48 when the measured power exceeds or is less than a predetermined range depends on the total power of the signal produced by the amplifier 48. In an alternative arrangement, where the signal comprises a number of data channels corresponding to video, audio, data etc. the average power of the signal is measured, and the gain fixed accordingly.

In a further embodiment, certain of the channels are weighted in the calculation of the average. The weighting will depend on the corresponding channel's sensitivity to noise and/or distortion. Furthermore, where the average is calculated, the midpoint of the predetermined range may change according to a running average of the power of the signal. In this manner, the invention is able to adapt to changing power characteristics of the signal.

Figure 6:
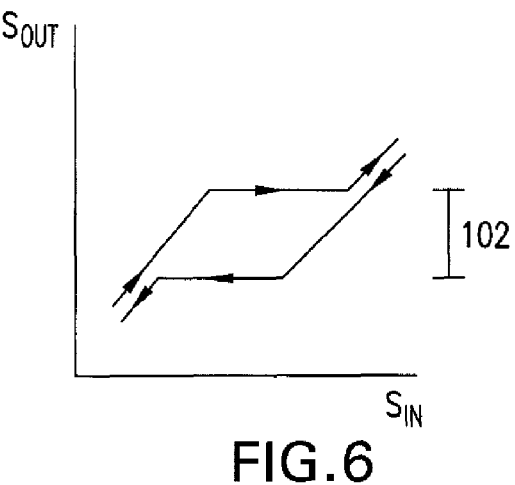
FIG. 6 is a diagram of power variation of an RF input and an output signal in the fiber optic transmitter and receiver illustrated in FIG. 5.

FIG. 6 illustrates a variation in the power of the RF input signal to the transmitter amplifier compared to that of the output signal at the receiver 80 ($S_{OUT}$—FIG. 5). As the power of the RF input signal increases, so does the power of the output signal. However, as the power of the RF signal decreases, the aforementioned predetermined range creates a hysteresis between the change in the RF input signal and the output signal. The magnitude 102 of this range is illustrated in FIG. 6.

As such, while the present invention has been described herein with reference to particular embodiments thereof, a latitude of modifications, various changes and substitutions are intended in the foregoing disclosure, and it will be appreciated that, in some instances, some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

The invention claimed is:

1. An optical communications transmitter module for communicating information, said optical communications transmitter module comprising an amplifier to amplify a modulated signal which forms an RF input to a laser, an output of said laser varying in accordance with said modulated signal, said optical communications transmitter module further comprising:
   (a) a detection circuit that can measure the power of said RF input to said laser;
   (b) a gain controller that can control a gain of said amplifier, said gain controller being connected to said detection circuit; and
   (c) a switch connected to said gain controller;
   wherein said detection circuit is adapted, in response to the activation of said switch, to measure the power of said RF input to said laser;
   wherein said gain controller is adapted, in response to the activation of said switch, to automatically vary said gain of said amplifier to cause a change in the power of said RF input to said laser so that the detection circuit can determine a power of said RF input that corresponds to a reduction in the noise and/or distortion associated with the optical communications transmitter module and so that the detection circuit can correlate said gain of said amplifier to the power of said RF input that corresponds to a reduction in the noise and/or distortion associated with the optical communications transmitter module; and
   wherein said gain controller can set said gain of said amplifier at a level corresponding to the power of said RF input that corresponds to a reduction in the noise and/or distortion associated with the optical communications transmitter module.

2. The optical communications module according to claim 1 wherein said gain controller sets said gain of said amplifier at a level corresponding to a minimum of said noise and/or distortion.

3. The optical communications module according to claim 1 wherein said switch is adapted for remote activation.

4. The optical communications module according to claim 1 wherein the detection circuit can determine a power of said RF input to said laser that corresponds to a reduction in the noise and/or distortion associated with the optical communications transmitter module by determining a power of said RF input to said laser that corresponds to a desired noise power ratio value.

5. An optical communications module for communicating information, said optical communications module comprising an amplifier to amplify a modulated signal which forms an RF input to a laser, an output of said laser varying in accordance with said modulated signal, said module further comprising:
   (a) a power detection circuit that can measure a power of said RF input to said laser; and
   (b) a gain controller that can control a gain of said amplifier, said gain controller being connected to said power detection circuit, wherein
   said gain controller is adapted to vary said gain of said amplifier in response to the power detection circuit determining that said power of said RF input falls outside of a predetermined range, wherein the gain controller can vary said gain until the power detection circuit detects that the power of said RF input is in the predetermined range and wherein the gain controller can hold the gain at a constant value in response to the power detection circuit determining that said power of said RF input is in the predetermined range.

6. The optical communications module according to claim 5 wherein said power detector is further adapted to measure a noise and/or distortion of said RF input to said laser and said controller is adapted to set said gain to an initial setting in dependence on a noise and/or distortion determination of said RF input by said detector, said predetermined range including said initial setting.

7. The optical communications module according to claim 6 wherein said initial setting defines a midpoint for said predetermined range.

8. The optical communications module according to claim 5 wherein said RF input includes a plurality of channels, each of said channels corresponding to a different transmitted data type.

9. The optical communications module according to claim 8 wherein at least one of said channels corresponds to data transmitted by means of a satellite.

10. The optical communications module according to claim 5 wherein said predetermined range is at least 1 dB.

11. The optical communications module according to claim 5 wherein said predetermined range is at least 4 dB.

12. The optical communications module according to claim 5 wherein said predetermined range is 8 dB.

13. The optical communications module according to claim 5 wherein said predetermined range is at least 15 dB.

14. The optical communications module according to claim 5 wherein said predetermined range is at least 20 dB.

15. A method of controlling gain of an amplifier in an optical communications module, said module comprising an amplifier to amplify a modulated signal which forms an RF input to a laser, an output of said laser varying in accordance with said modulated signal, said method comprising the steps of:

(a) measuring the power of said RF input to said laser;
(b) receiving an activation signal;
(c) in response to said activation signal, automatically varying said gain of said amplifier to cause a change in the power of said RF input to said laser;
(d) determining a power of said RF input that corresponds to a reduction in the noise and/or distortion associated with the optical communications module;
(e) correlating the gain of said amplifier to the power of said RF input that corresponds to the reduction in the noise and/or distortion associated with the optical communications module, and
(f) setting the gain of said amplifier at a level corresponding to the power of said RF input that corresponds to a reduction in the noise and/or distortion associated with the optical communications module.

16. A method of controlling gain of an amplifier in an optical communications module, said module comprising an amplifier to amplify a modulated signal which forms an RF input to a laser, an output of said laser varying in accordance with said modulated signal, said method comprising the steps of:
    (a) measuring a power of said RF input to said laser;
    (b) varying said gain of said amplifier in response to determining that said power of said RF input falls outside of a predetermined range;
    (c) stopping the varying of said of said amplifier in response to determining that said power of said RF input falls inside the predetermined range; and
    (d) holding said gain of said amplifier constant in response to determining that said power of said RF input falls inside the predetermined range.

17. The method according to claim 16 further comprising the steps of:
    detecting a noise and/or distortion of said RF input to said laser; and
    setting an initial gain of said amplifier in dependence on a detected noise and/or
    distortion of said RF input by said meter, wherein
    said predetermined range includes said initial gain setting.

18. The method according to claim 16, wherein said initial setting defines a midpoint for said predetermined range.

19. The method according to claim 16, wherein said RF input includes a plurality of channels, each of said channels corresponding to a different transmitted data type.

20. The method according to claim 16, wherein at least one of said channels corresponds to data transmitted by means of a satellite.

21. The method according to claim 16, wherein said predetermined range is at least 1 dB.

22. The method according to claim 16, wherein said predetermined range is at least 4 dB.

* * * * *